(12) United States Patent
Terndrup

(10) Patent No.: US 8,271,104 B2
(45) Date of Patent: Sep. 18, 2012

(54) METHOD AND SYSTEM FOR DYNAMIC OPTIMISATION OF INDUSTRIAL PROCESSES

(75) Inventor: Henrik Terndrup, Bergen (NL)

(73) Assignee: Terndrup Consult & Associates BV, Bergen (NL)

(*) Notice: Subject to any disclaimer, the term of this patent is extended or adjusted under 35 U.S.C. 154(b) by 280 days.

(21) Appl. No.: 12/765,672

(22) Filed: Apr. 22, 2010

(65) Prior Publication Data
US 2010/0274368 A1  Oct. 28, 2010

(51) Int. Cl.
G05B 13/02 (2006.01)

(52) U.S. Cl. .............................. 700/33; 700/29; 700/44

(58) Field of Classification Search ............ 700/12, 700/23, 27, 28, 29, 32, 33, 34, 44, 45, 52
See application file for complete search history.

(56) References Cited

U.S. PATENT DOCUMENTS

| | | | | |
|---|---|---|---|---|
| 5,519,605 | A * | 5/1996 | Cawlfield | 700/31 |
| 6,047,221 | A * | 4/2000 | Piche et al. | 700/44 |
| 6,278,899 | B1 * | 8/2001 | Piche et al. | 700/44 |
| 6,381,504 | B1 * | 4/2002 | Havener et al. | 700/44 |
| 6,738,677 | B2 * | 5/2004 | Martin et al. | 700/44 |
| 6,950,711 | B2 * | 9/2005 | Havener et al. | 700/28 |
| 7,050,866 | B2 * | 5/2006 | Martin et al. | 700/44 |
| 7,376,472 | B2 * | 5/2008 | Wojsznis et al. | 700/29 |
| 7,400,933 | B2 * | 7/2008 | Rawlings et al. | 700/28 |
| 7,930,044 | B2 * | 4/2011 | Attarwala | 700/44 |
| 2006/0074501 | A1 * | 4/2006 | Hartman et al. | 700/29 |
| 2006/0259197 | A1 * | 11/2006 | Boe et al. | 700/246 |

* cited by examiner

Primary Examiner — Charles Kasenge
(74) Attorney, Agent, or Firm — ARC IP Law, PC; Joseph J. Mayo

(57) ABSTRACT

Enables minimization of steady-state objective function $P(z\infty)$, subject to a set of constraints $zmin \leq z\infty \leq zmax$, and under the assumption that the values of the state vector, z, at different points in time related via a model expressed in dynamic open equation format $Q(z\infty, zk, zk-1, zk-2, \ldots, zk-n)=0$, where $z\infty$ is predicted final value of state vector, z, and $zk, zk-1, zk-2, \ldots, zk-n$ are current and previous values of state vector, z. Determines optimum operation of an industrial process having steady-state objective function $P(z\infty)$, including: receiving outputs from the process; minimizing steady-state objective function $P(z\infty)$ subject to set of constraints $zmin \leq z\infty \leq zmax$; wherein values of state vector at different times are related via model of form $Q(z\infty, zk, zk-1, zk-2, \ldots, zk-n)=0$; to minimize objective function $P(z\infty)$. Industrial process to be optimised may include measured and unmeasured process variables.

15 Claims, 3 Drawing Sheets

Typical Embodiment of the Invention

Memory-Less Non-linear Function Tables

Process Dynamics Database

- Objective Function for Data Reconciliation
- Constraint Limits for Data Reconciliation

- Objective Function for Optimisation
- Constraint Limits for Optimisation

- Reconciled model predictions

Dynamic Data Reconciliation Module

Dynamic Optimisation Module

- Raw Process Measurements from Process Control System

- Optimised Targets to Process Control System

Process Control System

Typical Embodiment of the Invention

Middle Distillate Production System for Refinery with 2 Crude Distillation Units

METHOD AND SYSTEM FOR DYNAMIC OPTIMISATION OF INDUSTRIAL PROCESSES

This application takes priority from Australian Patent Application 2009901726, filed 22 Apr. 2009, the specification of which is hereby incorporated herein by reference.

FIELD OF THE INVENTION

One or more embodiments of the invention relate generally to methods for use with the optimisation of industrial processes, and more particularly to the application of non-linear optimisation of such processes.

BRIEF SUMMARY OF THE INVENTION

It is an object of one or more embodiments of the invention to provide a system and method that can determine the value for a set of measured as well as unmeasured process variables that minimises an objective function subject to a set of constraints applied to the process variables.

It is an object of one or more embodiments of the invention to overcome, or at least substantially ameliorate, the disadvantages and shortcomings of the prior art.

Other objectives and advantages of one or more embodiments of the invention will become apparent from the following description, in connection with the accompanying drawings, wherein, by way of illustration and example, an embodiment of the invention is disclosed.

BRIEF DESCRIPTION OF THE DRAWINGS

The above and other aspects, features and advantages of the ideas conveyed through this disclosure will be more apparent from the following more particular description thereof, presented in conjunction with the following drawings wherein.

DETAILED DESCRIPTION OF THE INVENTION

Figure 1:
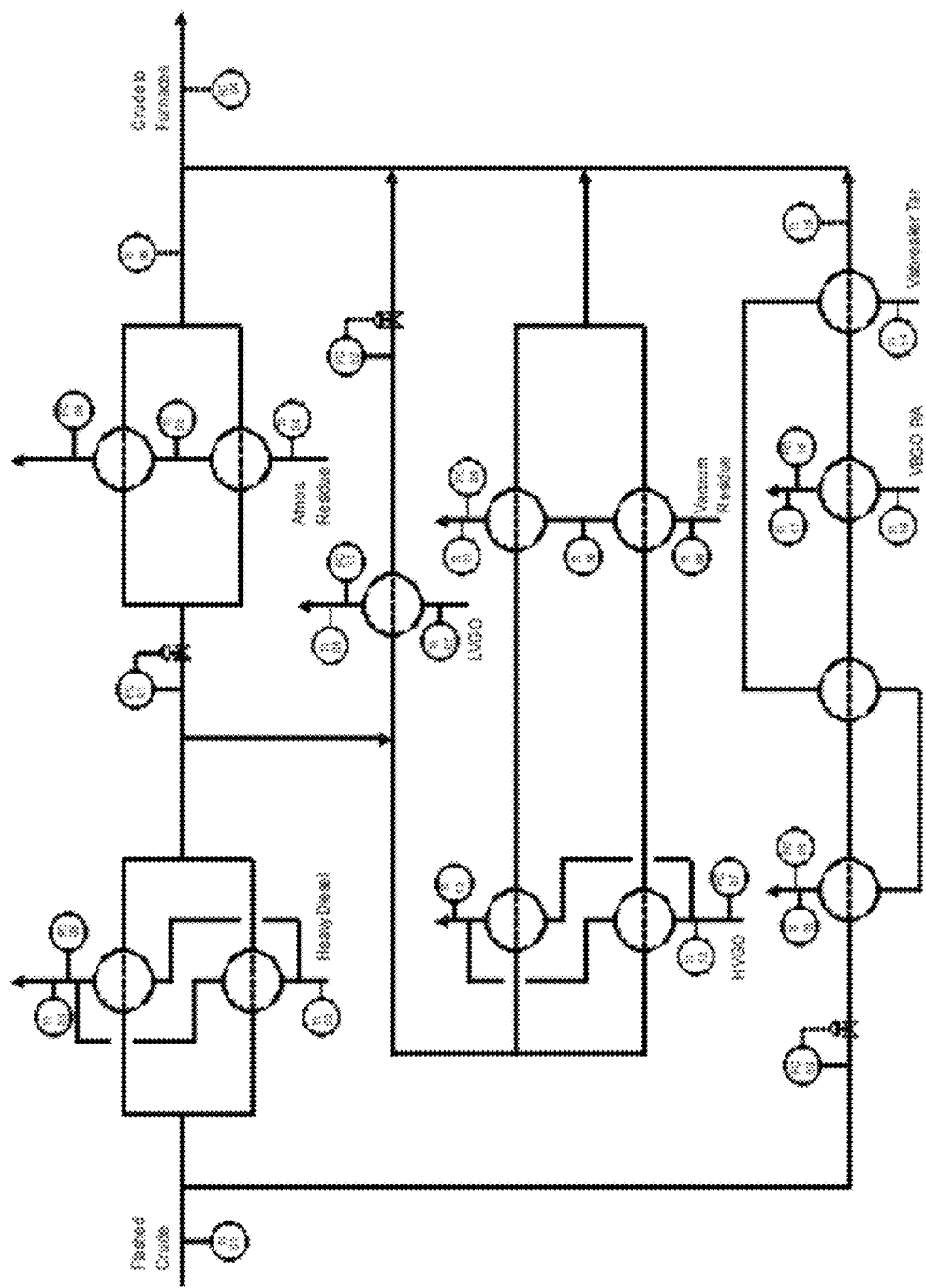
FIG. 1 shows a section of a typical heat exchange network for the preheat of the feed to a crude distillation unit.

According to one or more embodiments of the invention, although this should not be seen as limiting the invention in any way, there is provided a method and system for minimisation of a steady-state objective function $P(z\infty)$, subject to a set of constraints $z_{min} \leq z\infty \leq z_{max}$, and under the assumption that the values of the state vector, z, at different points in time are related via a model expressed in the dynamic open equation format $Q(z_\infty, z_k, z_{k-1}, z_{k-2}, \ldots zk-n)=0$, where $z_\infty$ is the predicted final value of the state vector, z, and $z_k, z_{k-1}, z_{k-2}, z_{k-ti}$ are current and previous values of the state vector, z.

A further form of the invention resides in a method for determining the optimum operation of an industrial process, the process having a steady-state objective function $P(z_\infty)$, the method including the steps of: receiving outputs from the process; minimising the steady-state objective function $P(z_\infty)$ subject to a set of constraints $z_{min} \leq z_\infty \leq z_{max}$; wherein values of the state vector at different points in time are related via a model of the form $Q(z_\infty, z_k, z_{k-1}, z_{k-2}, \ldots z_{k-n})=0$; so as to minimise the objective function $P(z_\infty)$.

In preference, the industrial process to be optimised may include measured as well as unmeasured process variables.

In preference, where the steady-state objective function, $P(z_\infty)$, can be expressed as the sum of a set of second order polynomials, $P = A \cdot z_\infty + (z_\infty - z_{tgt})^T \cdot B \cdot (z_\infty - z_{tgt})$, where A is a vector of constants typically referred to as the LP coefficients, B is a diagonal matrix of constants typically referred to as the QP coefficients and $z_{tgt}$ is a vector of so called ideal resting values for the state vector elements.

In preference, where the model, Q, can be approximated by a set of so called Wiener-Hammerstein block-oriented non-linear models (Pearson and Pottmann, 2000), which include the interconnection of Linear Time Invariant (LTI) systems and static (memory-less) nonlinearities, i.e. $y(s) = H_x(s)x(s) + H_u(s)u(s)$, where y(s) is the Laplace transform of a subset, y, of the state vector, z, which is referred to as the dependent variable vector, x(s) the Laplace transform of another state vector subset, x, which is referred to as the measured independent variable vector, u(s) is the Laplace transform of the remaining part of the state vector, which is referred to as the unmeasured independent vector, $H_x(s)$ and $H_u(s)$ are matrices of transfer functions that describe the dynamic relation between the independent variables, x and u, and the dependent variables, y. Each element in these matrices is expressed as a function of the following form $$h_{x,ij} = f_{x,ij}(z_\infty) g_{x,ij}(s)$$

$$h_{u,ij} = f_{u,ij}(z_\infty) g_{u,ij}(s),$$

where $f_{x,ij}(z_\infty)$, $f_{u,ij}(z_\infty)$ are non-linear functions of the elements of the final value, $z_\infty$, of the state vector $g_{x,ij}(s), g_{u,ij}(s)$ are the La Place transfer function of the linear dynamics of the matrix element (i,j)

In preference, each function, $f_{x,ij}(z_\infty)$ or $f_{u,ij}(z_\infty)$, of the memory-less non-linearity is stored in a spreadsheet cell with an associated database for the linear dynamic counterpart.

In preference, the functions of the memory-less non-linearity are linearised at each execution of the optimisation system and the dynamic parts are utilised to predict the final state of the system, $z_\infty$, assuming no further actions are taken, so that the non-linear dynamic optimisation problem can be solved as a sequence of linear static optimisation problems, e.g. using linear programming techniques, and so that the process can be optimised even during transients, where the process is not in a steady state.

In preference, the invention lies in a method and/or system for solving dynamic data reconciliation and parameter estimation problems for systems that can be described by the block oriented model structure presented above.

In preference, the model is stored in a spreadsheet, that for example executes on a computer system having a central processing unit and memory.

In preference, the dynamic portion is used to synchronise the system variables in time by prediction of the steady-state, and the memory-less non-linearities are linearised at each execution so that the non-linear dynamic data reconciliation and parameter estimation problem can be solved as a sequence of static linear problems, e.g. using linear programming techniques, and so that the data reconciliation and parameter estimation can be performed even during transients, where the process is not in a steady state.

In preference, the combination of the methods described above so that the same system and the same model can be used for non-linear dynamic optimisation and for non-linear dynamic data reconciliation and parameter estimation.

It is recognised that departures can be made within the scope of the invention, and that various modifications may be made in details of design and construction and process steps, parameters of operation etc., without departing from the scope and ambit of the invention.

EXAMPLE 1

Optimisation of Branch Flows in a Heat Exchange Network

This example illustrates the application of the invention to the optimisation of the branch flows in a heat exchange network. FIG. 1 shows a section of a typical heat exchange network for the preheat of the feed to a crude distillation unit.

The primary optimisation objective here is of course to maximise the temperature of the combined crude furnace inlet stream, estimated as the weighted average of the four branch temperatures, i.e.

$$T_{AVG} = \frac{F_{CDU} * T_{CDU} + F_{VDU1} * T_{VDU1} + F_{VDU2} * T_{VDU2} + F_{VBU} * T_{VBU}}{F_{CDU} + F_{VDU1} + F_{VDU2} + F_{VBU}}$$

Each heat exchanger in the network is modelled by the following basic equations:

$$Q = cp_{HS} * sg_{HS} * F_{HS} * (Tin_{HS} - Tout_{HS}) = cp_{CS} * sg_{CS} * F_{CS} * (Tout_{CS} - Tin_{CS}) = U * A * MTD$$

where
Q is the heat duty of the exchanger, kJ/h
cp is the heat capacity, kJ/kg/° C.
sg is the density, kg/m3
F is the volumetric flow, m3/h
Tin is the inlet temperature, ° C.
Tout is the outlet temperature, ° C.
U is the heat transfer coefficient, kJ/m$^2$/° C.
A is the surface area, m$^2$
MTD is the corrected logarithmic mean temperature difference, ° C.
and where subscript HS refers to the hot side and subscript CS refers to the cold side.

The corrected logarithmic mean temperature difference, MTD, is defined as $$MTD = f * LMTD$$

$$LMTD = \frac{(Tin_{HS} - Tout_{CS}) - (Tout_{HS} - Tin_{CS})}{LN(Tin_{HS} - Tout_{CS}) - LN(Tout_{HS} - Tin_{CS})}$$

where f is a correction factor that depends on the design of the exchanger shells.

Now, especially if cp*sg and U*A*f can be assumed to be fairly constant, then it is relatively straightforward to rewrite the above equations in a dynamic open-equations format, $Q(z_\infty, z_k, z_{k-1}, z_{k-2}, \ldots, z_{k-n}) = 0$. The resulting equation system, which has the flows and temperatures as independent variables and the basic heat balance equations as constraints, can then be implemented in a Wiener-Hammerstein block-oriented form as described above.

In reality, the heat transfer coefficients will of course vary due to exchanger fouling and variations in the product flow rates and product properties. Hence, the heat transfer coefficients are estimated on-line from process measurements. In the general case, this presents a typical data reconciliation and parameter estimation problem, where redundant information exists for some exchangers, whereas some exchangers require inputs that are estimated from the heat balance of other exchangers.

Figure 2:
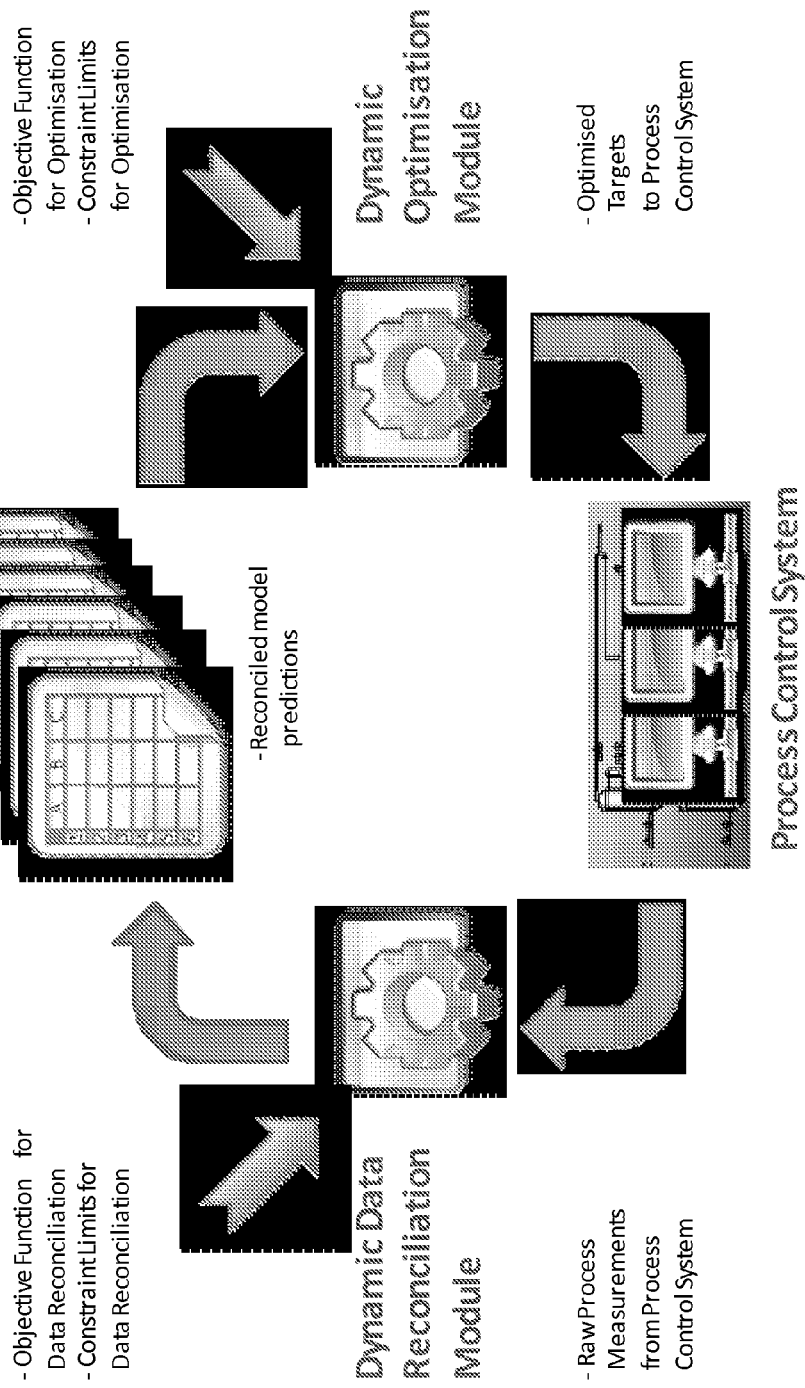
FIG. 2 shows a typical embodiment of the invention is shown in FIG. 2.

A typical embodiment of the invention is shown in FIG. 2.

In this diagram, the Process Control System represents the plant, including the regulatory control system and any Multivariable Predictive Control (MPC) applications or other Advanced Process Control (APC) applications. The process control system includes one or more computers as shown.

The process model, $Q(z_\infty, z_k, z_{k-1}, z_{k-2}, \ldots, z_{k-n}) = 0$, is expressed in a Wiener-Hammerstein block oriented form and is stored in a spreadsheet as tables of memory-less non-linear functions and an associated database of linear dynamics, expressed as La Place transfer functions. In one or more embodiments the spreadsheet and or database executes on the one or more computers shown as part of the Process Control System.

The Dynamic Data Reconciliation Module reads raw data from the Process Control System and solves the QP optimisation problem that minimises $Q^T \cdot W_1 \cdot Q + (z - z_{meas})^T \cdot W_2 \cdot (z - z_{meas})$, Where
$W_1$ is a diagonal matrix of weight factors for the model
$W_2$ is a diagonal matrix of weight factors for the measurements
$z_{meas}$ is the measured state vector
z is the reconciled state vector.

Using the reconciled state vector, the Dynamic Optimisation Module now solves the optimisation problem to find a solution that minimises a steady-state economic objective function, $P(z_\infty = A \cdot z_\infty + (z_\infty - z_{tgt})^T \cdot B \cdot (z_\infty - z_{tgt})$ In this example, the measured process variables would typically include all the flow and temperature measurements shown in FIG. 1.

The unmeasured process variables in the example illustrated in FIG. 1 would typically include the unmeasured flows and temperatures as well as the heat transfer coefficients of the individual exchangers.

The process model in the example illustrated in FIG. 1 would typically include a set of basic steady-state heat balance equations, one for each exchanger, combined with a set of linear dynamics representing each exchanger as a first or second order La Place transfer function.

The objective function for the economic optimisation in the example illustrated in FIG. 1 could simply consist of a negative coefficient on the combined furnace inlet temperature, which would then be maximised.

EXAMPLE 2

Optimisation of Middle Distillate Production

This example illustrates the application of the invention to the optimisation of the production of middle distillates, including Ultra Low Sulphur Diesel (ULSD); basically the system in this case optimises the cutpoints of two crude distillation units and the blending recipes of the various products in order to achieve the most profitable output of finished Kerosene, Diesel and Gasoil. Assuming that the crude feed rates to the two towers are fixed by other considerations and constraint, there are essentially sixteen degrees of freedom available to control and optimise the production rates and the qualities of the three products. These are the naphtha flows from the two fractionators, the flows of kerosene from the two fractionators to finished kerosene sales and the six component flows to each of the blended products, Diesel and Gasoil.

Figure 3:
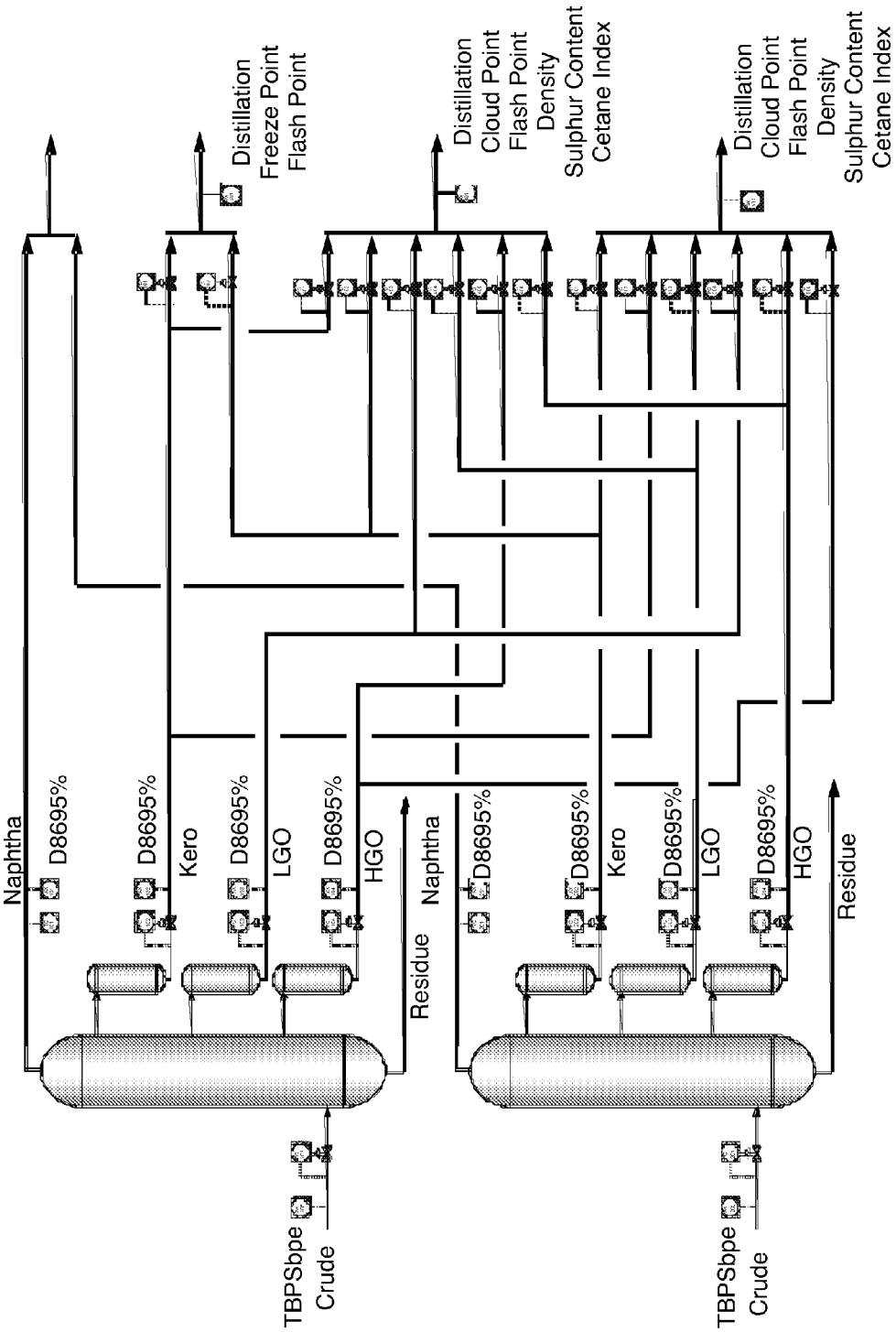
FIG. 3 shows a process model.

Often, the regulatory control system will result in a slightly different set of independent variables, e.g. because the naphtha draw flows are replaced by the top temperatures of the two fractionators and the component flows to the gasoil blender are on pressure control, which allows the six total side draw flows to be specified instead of the flows to the gasoil blender, as illustrated in FIG. 3. Obviously, this does not alter the degrees of freedom of the system.

There will typically be about twelve active constraints in such a system at any one time. The typical constraints include product qualities, minimum and maximum production rates and physical limitations within the crude fractionators, e.g. tray flooding or dry-up. The fact that this type of system typically has more degrees of freedom than constraints means that the optimisation of this system may involve several unconstrained optima or trade-offs.

For example, if the diesel and gasoil products are both already at their "backend" specification, typically the D86 distillation in the summer period and the cloud point in the winter period, then one of the questions that the optimiser should be able to answer is if lowering the HGO draw from the "100" crude unit and increasing that of the "200" crude unit will increase the overall middle distillate yield at fixed "backend" quality. The same issue also exists for the naphtha draws, or the fractionator top temperatures that are typically used to control the naphtha yields. If the kerosene product is already at the minimum flash point specification, would lowering the naphtha yield from the "100" crude unit and increasing that from the "200" crude unit increase the overall middle distillate yield subject to a fixed kerosene flash point specification? Similar issues exist for the "cutpoints" between the other adjacent draws, e.g. LGO and HGO.

In general, the solution to the unconstrained optimisation problem described above requires knowledge about all the component qualities and how they vary as function of the draw flows, which typically requires detailed information about the quality of the feeds to the two crude units. Often, however, this information is not available or the available information is inaccurate or incomplete.

In the example illustrated in FIG. 3, the measured process variables will typically include the component flow rates going into the various finished product blends and the qualities of the finished products. In some cases, however, not all the component flows are measured, i.e. some may have to be estimated as the difference between other flows and are there considered unmeasured.

The unmeasured process variables in the example illustrated in FIG. 3 would typically include the feed qualities, some of the qualities of the blend components and possibly some of the component flows.

The process model in the example illustrated in FIG. 3 would typically include simplified model representations of quality-versus-yield for each of the relevant qualities and for each of the two crude units and simplified model representations of the applicable blending rules for each of the relevant qualities.

The Dynamic Data Reconciliation Module solves the problem of reconciling the measured process variables with the process model and estimating values for the unmeasured process variables that minimise the weighted sum of squared model error plus the weighted sum of squared deviations from the measured flows and qualities.

Given the estimated state vector from the Dynamic Data Reconciliation Module the Dynamic Optimisation Module can now optimise the state vector in order to minimise a given cost function, which in the example illustrated in FIG. 3 would typically be the operating profit of the plant per unit of time, i.e. the value of the products less the cost of the feed and less any variable operating costs.

The example also illustrates a particular advantage of the proposed embodiment of the invention. In the solution of the general data reconciliation and parameter estimation problem, the prior art generally distinguishes between a number of specific situations, i.e. the problem can be overspecified, resulting in a data reconciliation problem, underspecified, resulting in a parameter estimation problem with an infinite number of solutions or exactly specified, resulting in a parameter estimation problem with a single solution.

Using the invention presented here, the same process model and the same optimisation algorithm can be used to solve the economic optimisation problem as well as the data reconciliation and parameter estimation problem.

It should be noted that a given model matrix may include a mixture of overspecified and underspecified subsystems and that an overspecified model matrix for a given plant may become underspecified, e.g. if a number of on-line analysers are temporarily out of service.

Hence, the versatility and robustness of the method and system disclosed in this patent is considered a major advantage over the prior art.

REFERENCES

Pearson, R. and M. Pottmann, "Gray-box identification of block-oriented nonlinear models", Journal of Process Control, 10, 301-315 (2000).

The invention claimed is:

1. A method for optimising a process for a system having a steady-state objective function $P(z_\infty)$ comprising:
    producing a minimisation of said steady-state objective function $P(z_\infty)$ using a computer wherein said minimisation is subject to a set of constraints wherein $z_{min} \leq Z_\infty \leq Z_{max}$ and wherein values of a state vector, z, at different points in time are related via a model expressed in a dynamic open equation format $Q(z_\infty, z_k, z_{k-1}, z_{k-2}, \ldots, z_{k-n}) = 0$, where $z_\infty$ is a predicted final value of the state vector, z, and $z_k, z_{k-1}, z_{k-2}, \ldots, z_{k-n}$ are current and previous values of the state vector, z;
    using said minimisation of said steady-state objective function $P(z_\infty)$ to control said process via said computer;
    wherein said steady-state objective function, $P(z_\infty)$, is expressed as the sum of a set of second order polynomials, $P = A \cdot z_\infty + (z_\infty - z_{tgt})^T \cdot B \cdot (z_\infty - z_{tgt})$, wherein:
    A is a vector of constants (LP coefficients);
    B is a diagonal matrix of constants (QP coefficients); and
    $Z_{tgt}$ is a vector of so called ideal resting values for state vector elements.

2. The method of claim 1, wherein said process to be optimised can include measured and unmeasured process variables.

3. The method of claim 1, wherein the model, Q, is approximated by Wiener-Hammerstein block-oriented nonlinear models comprising an interconnection of Linear Time Invariant (LTI) systems and static memory-less nonlinearities, or $y(s) = H_x(s)x(s) + H_u(s)u(s)$, where
    y(s) is a Laplace transform of a subset, y, of the state vector, z, which is referred to as a dependent variable vector,
    x(s) the Laplace transform of another state vector subset, x, which is referred to as a measured independent variable vector, u(s) is the Laplace transform of a remaining part of the state vector, z, which is referred to as an unmeasured independent vector, $H_x(s)$ and $H_u(s)$ are matrices of transfer functions that describe a dynamic relation between independent variables, x and u, and dependent variables, y;

wherein $$h_{x,ij} = f_{x,ij}(z_\infty) g_{x,ij}(s)$$

$$h_{u,ij} = f_{u,ij}(z_\infty) g_{u,ij}(s)$$

where $f_{x,ij}(z_\infty)$, $f_{u,ij}(z_\infty)$ are non-linear functions of elements of a final value, $z_\infty$, of the state vector, z, and $g_{x,ij}(s)$, $g_{u,ij}(s)$ are the Laplace transfer function of the linear dynamics of matrix element (i,j).

4. The method of claim 3, wherein each function, $f_{x,ij}(z_\infty)$ or $f_{u,ij}(z_\infty)$, of said static memory-less non-linearities is stored in a spreadsheet cell with an associated database for a linear dynamic counterpart.

5. The method of claim 3 wherein the functions of the static memory-less non-linearities are linearised at each execution of the optimisation system and dynamic parts are utilised to predict a final state of system, $z_\infty$, so that a non-linear dynamic optimisation problem can be solved as a sequence of linear static optimisation problems.

6. A method for determining the optimum operation of an industrial process using said model of claim 3, the process having a steady-state objective function $P(z_\infty)$, and wherein said method comprises:

receiving measured outputs from said industrial process;

reconciling the measured outputs and estimating unmeasured outputs using said model;

minimising said steady-state objective function $P(z_\infty)$ subject to a set of constraints $z_{min} \leq z_\infty \leq z_{max}$;

wherein values of the state vector at different points in time are related via a model of the form $Q(z_\infty, z_k, z_{k-1}, z_{k-2}, \ldots, z_{k-n}) = 0$; so as to minimise the objective function $P(z_\infty)$ and using said minimisation of said steady-state objective function $P(z_\infty)$ to control said process.

7. An apparatus for controlling a system utilizing the method as claimed in claim 1.

8. An apparatus for controlling a system utilizing the method as claimed in claim 6.

9. A non-transitory computer readable medium comprising modules configured to implement the method of claim 1 wherein said modules execute on a computer and wherein said modules comprise:

a process control system interface;
a dynamic prediction algorithm;
a matrix generator;
a data reconciliation and parameter estimation algorithm; and,
an economic optimisation algorithm.

10. A computer configured to optimise a process for a system having a steady-state objective function $P(z_\infty)$ wherein said computer is configured to:

produce a minimisation of said steady-state objective function $P(z_\infty)$ subject to a set of constraints wherein $z_{min} \leq Z_\infty \leq z_{max}$ and wherein values of a state vector, z, at different points in time are related via a model expressed in a dynamic open equation format $Q(z_\infty, z_k, z_{k-1}, z_{k-2}, \ldots, z_{k-n}) = 0$, where $z_\infty$ is a predicted final value of the state vector, z, and $z_k, z_{k-1}, z_{k-2}, \ldots, z_{k-n}$ are current and previous values of the state vector, z; and use said minimisation of said steady-state objective function $P(z_\infty)$ to control said process via said computer;

wherein said steady-state objective function, $P(z_\infty)$, is expressed as the sum of a set of second order polynomials, $P = A \cdot z_\infty + (z_\infty - z_{tgt})^T \cdot B \cdot (z_\infty - z_{tgt})$, wherein:

A is a vector of constants (LP coefficients);
B is a diagonal matrix of constants (QP coefficients); and
$z_{tgt}$ is a vector of so called ideal resting values for state vector elements.

11. The computer of claim 10, wherein said process to be optimised can include measured and unmeasured process variables.

12. The computer of claim 10, wherein the model, Q, is approximated by Wiener-Hammerstein block-oriented non-linear models comprising an interconnection of Linear Time Invariant (LTI) systems and static memory-less nonlinearities, or $y(s) = H_x(s)x(s) + H_u(s)u(s)$, where y(s) is a Laplace transform of a subset, y, of the state vector, z, which is referred to as a dependent variable vector, x(s) the Laplace transform of another state vector subset, x, which is referred to as a measured independent variable vector, u(s) is the Laplace transform of a remaining part of the state vector, z, which is referred to as an unmeasured independent vector, $H_x(s)$ and $H_u(s)$ are matrices of transfer functions that describe a dynamic relation between independent variables, x and u, and dependent variables, y;

wherein $$h_{x,ij} = f_{x,ij}(z_\infty) g_{x,ij}(s)$$

$$h_{u,ij} = f_{u,ij}(z_\infty) g_{u,ij}(s),$$

where $f_{xx,ij}(z_\infty)$, $f_{u,ij}(z_\infty)$ are non-linear functions of elements of a final value, $z_\infty$, of the state vector, z, and $g_{x,ij}(s)$, $g_{u,ij}(s)$ are the Laplace transfer function of the linear dynamics of matrix element (i,j).

13. The computer of claim 12, wherein each function, $f_{x,ij}(z_\infty)$ or $f_{u,ij}(z_\infty)$, of said static memory-less non-linearities is stored in a spreadsheet cell with an associated database for a linear dynamic counterpart.

14. The computer of claim 12 wherein the functions of the static memory-less non-linearities are linearised at each execution of the optimisation system and dynamic parts are utilised to predict a final state of the system, $z_\infty$, so that a non-linear dynamic optimisation problem can be solved as a sequence of linear static optimisation problems.

15. The computer of claim 12, configured to determine the optimum operation of an industrial process using said model, wherein said industrial process includes a steady-state objective function $P(z_\infty)$, and wherein said computer is further configured to:

receive measured outputs from said industrial process;

reconcile the measured outputs and estimating unmeasured outputs using said model;

minimise said steady-state objective function $P(z_\infty)$ subject to a set of constraints $z_{min} \leq Z_\infty \leq z_{max}$;

wherein values of the state vector at different points in time are related via a model of the form $Q(z_\infty, z_k, z_{k-1}, z_{k-2}, \ldots, z_{k-n}) = 0$; so as to minimise the objective function $P(z_\infty)$ and use said minimisation of said steady-state objective function $P(z_\infty)$ to control said industrial process.

* * * * *